United States Patent
Bashore et al.

[19]

[11] Patent Number: 6,047,388
[45] Date of Patent: Apr. 4, 2000

[54] METHOD AND APPARATUS FOR PROCESSING AN INVALID ADDRESS REQUEST

[75] Inventors: Tracy James Bashore, Rochester; Thomas Alan Liebsch, Byron, both of Minn.

[73] Assignee: International Business Machines Corporation, Armonk, N.Y.

[21] Appl. No.: 08/838,723

[22] Filed: Apr. 9, 1997

[51] Int. Cl.⁷ .................................................... G06F 11/00
[52] U.S. Cl. .............................................. 714/38; 714/53
[58] Field of Search ................ 395/183.14, 185.06, 395/829, 824; 371/22.35, 27.6, 40.13; 714/38, 53, 730, 743, 768; 710/4, 9, 26

[56] References Cited

U.S. PATENT DOCUMENTS

| | | | |
|---|---|---|---|
| 4,456,954 | 6/1984 | Bullions, III et al. | 711/207 |
| 5,237,668 | 8/1993 | Blandy et al. | 395/400 |
| 5,295,260 | 3/1994 | Pribnow | 395/183.01 |
| 5,467,457 | 11/1995 | Kohda et al. | 395/429 |
| 5,497,469 | 3/1996 | Sakata et al. | 395/413 |
| 5,544,293 | 8/1996 | Nozawa | 395/412 |
| 5,579,505 | 11/1996 | Ohkami | 395/482 |
| 5,604,864 | 2/1997 | Noda | 395/184.01 |
| 5,684,974 | 11/1997 | Onodera | 395/412 |
| 5,687,392 | 11/1997 | Radko | 395/842 |

FOREIGN PATENT DOCUMENTS

| | | |
|---|---|---|
| 0742512A2 | 11/1996 | European Pat. Off. . |
| 5-120134 | 5/1993 | Japan . |

*Primary Examiner*—Dieu-Minh T. Le
*Attorney, Agent, or Firm*—Joan Pennington

[57] ABSTRACT

A method, apparatus, and computer program product are provided for processing an invalid address request in a computer system. A processor in the computer system receives an address requested from software and compares a real address requested with a real address range available. An invalid address request is a real address requested outside the real address range available. Responsive to identifying an invalid address, the processor issues an interrupt to supervising software. Then an address exception is posted to the user software, if appropriate.

19 Claims, 3 Drawing Sheets

METHOD AND APPARATUS FOR PROCESSING AN INVALID ADDRESS REQUEST

FIELD OF THE INVENTION

The present invention relates to the data processing field, and more particularly, relates to a method, apparatus and computer program product for processing an invalid address request.

DESCRIPTION OF THE PRIOR ART

When software accesses a physical main store address outside of the address range of the memory subsystem, the hardware will machine check and then the system will come down if that address is requested on the system memory bus.

This happens often during early software development and integration when numerous software bugs cause invalid addresses to be generated. Furthermore, a customer's office is even exposed to this machine check condition when fixes or new software is distributed to the field.

SUMMARY OF THE INVENTION

Important objects of the present invention are to provide an improved method and computer program product for processing an invalid address request in a computer system; to provide such improved method and computer program product substantially without negative effects and that overcome many disadvantages of prior art arrangements In brief, a method and computer program product are provided for processing an invalid address request in a computer system. A processor in the computer system receives an address requested from software and compares the address requested with a real address range available. An invalid address request is a real address requested outside the real address range available. Responsive to identifying an invalid address, the processor issues an interrupt to supervising software.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
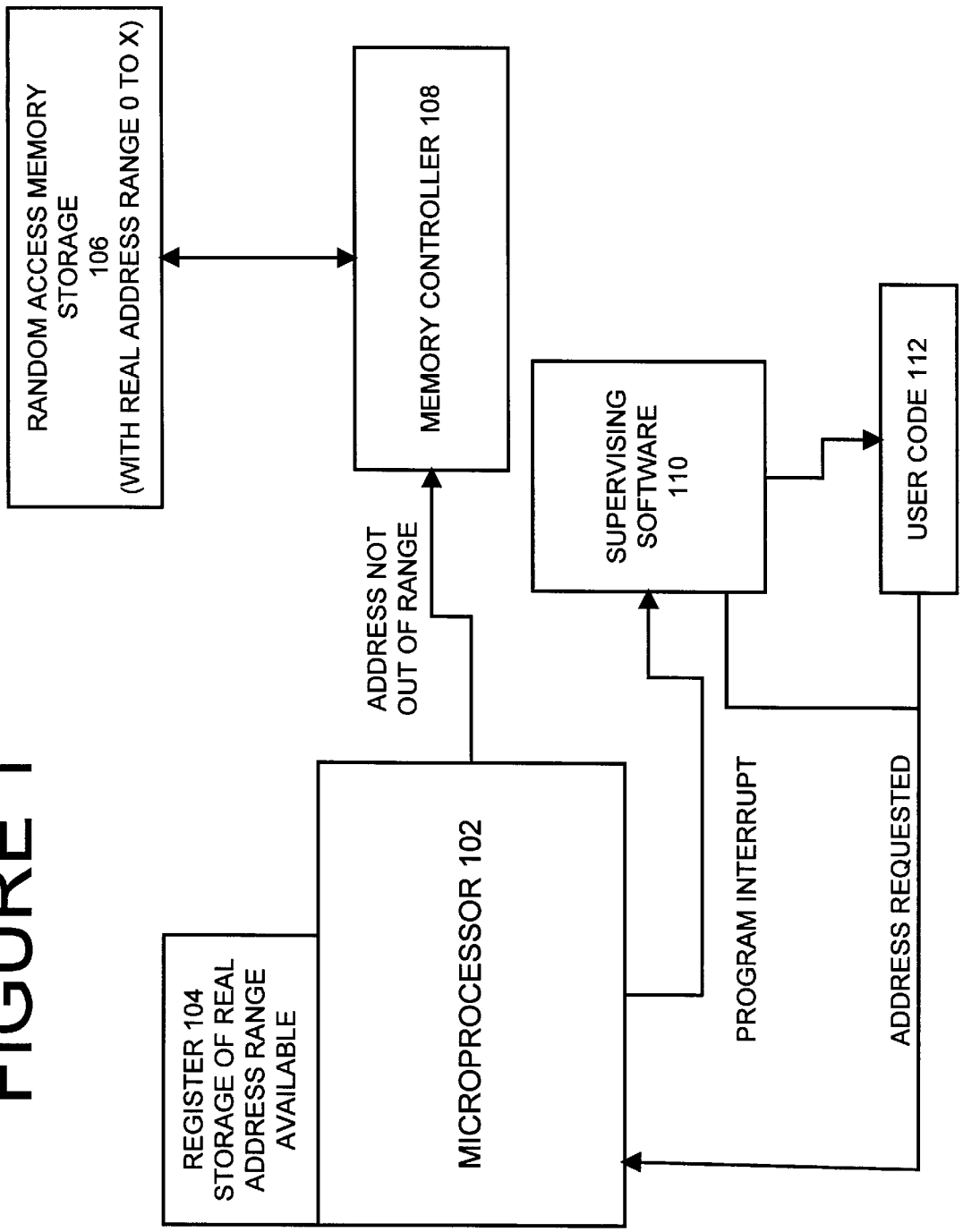
FIG. 1 is a block diagram representation of a computer or data processing system of the preferred embodiment.

Having reference now to the drawings, in FIG. 1 there is shown a computer or data processing system of the preferred embodiment generally designated by the reference character 100. As shown in FIG. 1, computer system 100 includes a central processor unit or microprocessor 102 having a register 104 for storage of a real address range available in a random access memory 106, a memory controller 108, a supervising software 110, and a user software or user code 112. Microprocessor register 104 stores the valid address range and any memory holes that may exist for the RAM storage 106 coupled to the microprocessor 102.

In accordance with features of the preferred embodiment, microprocessor 102 is used to detect an invalid real address before issuing a memory request to the memory controller 108. When supervising software 110 or user code 112 issues an address request as indicated at a line ADDRESS REQUESTED, microprocessor 102 compares a real address requested with the real address range stored in microprocessor register 104. In system 100, the software 110 or 112 may issue a virtual address request which is translated to a real address requested by the microprocessor 102. When an invalid or out of range real address is identified, then microprocessor 102 issues an interrupt to the supervising software 110 as indicated at a line PROGRAM INTERRUPT. The supervising software 110 then handles the error in a non-machine check mechanism, by killing the task or process that requested the invalid address and posting a soft error to the customer or user code 112, if appropriate. When a valid real address is identified, the microprocessor 102 issues the memory request to the memory controller 108 as indicated at a line ADDRESS NOT OUT OF RANGE.

Various commercially available processors could be used for computer system 100, for example, an IBM personal computer or similar workstation can be used. Central processor unit 102 is suitably programmed to execute the flowchart of FIG. 2, for processing invalid address requests of the preferred embodiment.

Figure 2:
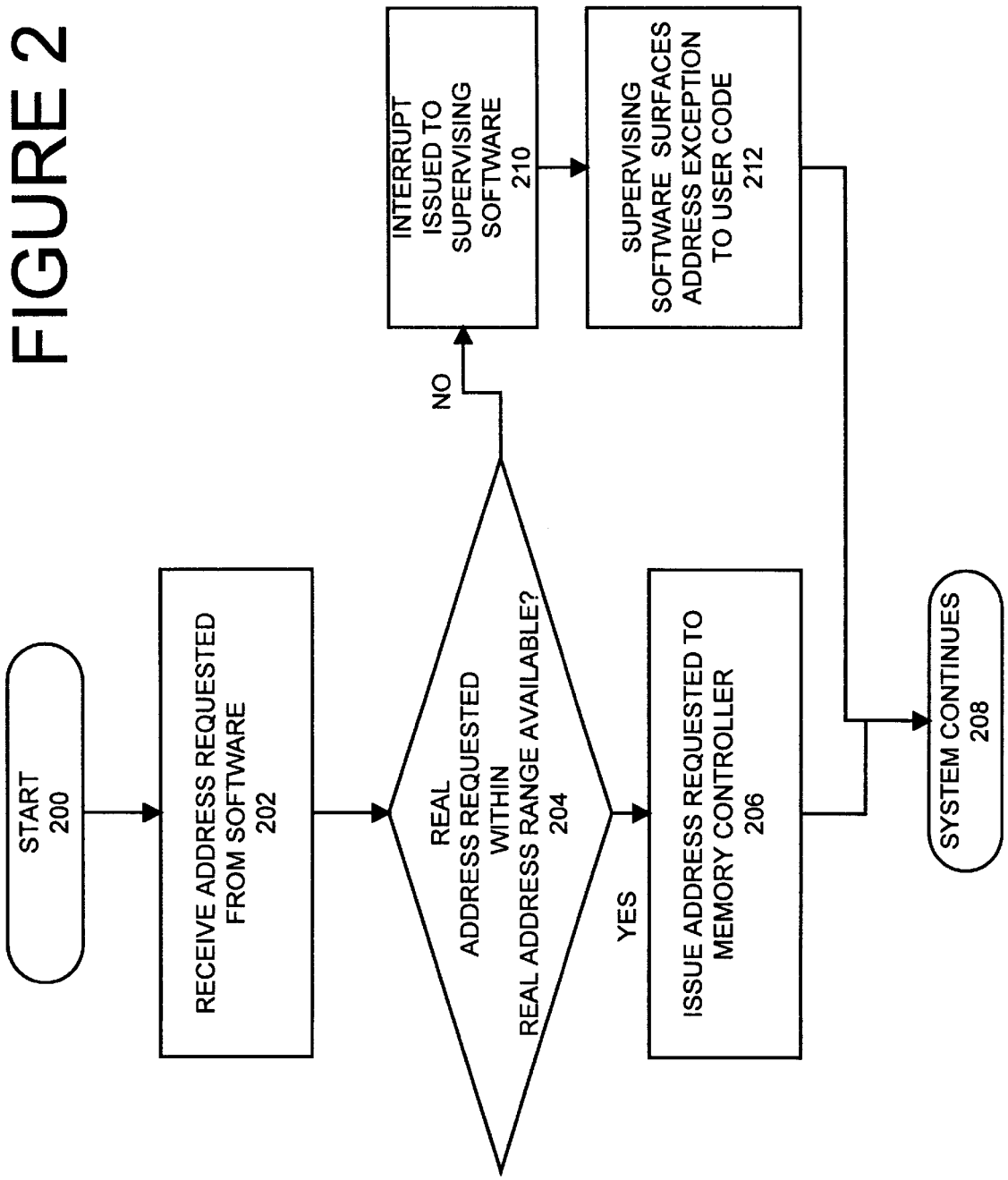
FIG. 2 is a flow chart illustrating the method and computer program product of the preferred embodiment.

Referring to FIG. 2, there are shown sequential steps for processing invalid address requests. First a particular address requested from supervising software 110 or user code 112 is received by the microprocessor 102 as indicated at a block 202. Microprocessor 102 compares the real address requested with the real address range available for the RAM storage 106 as indicated at a decision block 204. When a real address requested is within the address range available or a valid address, then microprocessor 102 issues the address requested to the memory controller 108 as indicated at a block 206. Then system operation continues as indicated at a block 208. When a real address requested is not within the address range available or is an invalid address, then microprocessor 102 issues an interrupt to supervising software 110 as indicated at a block 210. Then supervising software 110 surfaces an address exception to the user code 112 and a soft error is posted as indicated at a block 212, if appropriate. The supervising software 110 may request system 100 to power down, if required; however, a hardware machine check condition is avoided. Then system operation continues as indicated at a block 208.

Figure 3:
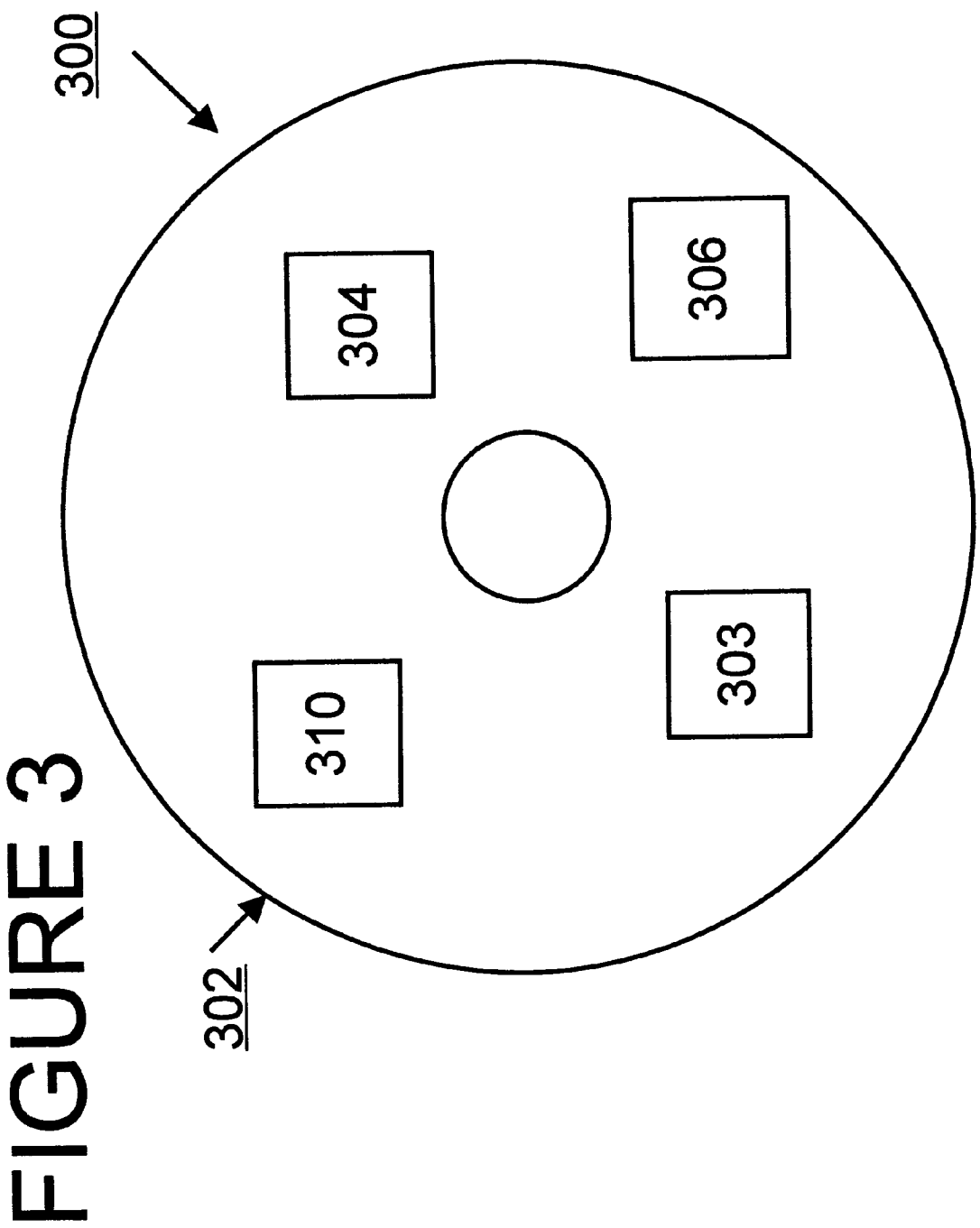
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the method of the preferred embodiment in the system 100 of FIG. 1.

A sequence of program instructions or a logical assembly of one or more interrelated modules defined by the recorded program means 304, 306, 308, 310, direct the computer system 100 for processing invalid address requests of the preferred embodiment.

While the present invention has been described with reference to the details of the embodiments of the invention shown in the drawing, these details are not intended to limit the scope of the invention as claimed in the appended claims.

What is claimed is:

1. A computer implemented method for processing an invalid address request in a computer system including a central processor unit and a memory controller, said method performed by said central processor unit comprising the steps of:

receiving an address requested from software;

comparing a real address requested with a real address range available; the invalid address request being outside said real address range available; and responsive to identifying an invalid address, issuing an interrupt to supervising software.

2. A computer implemented method for processing an invalid address request in a computer system as recited in claim 1 further includes the step of storing said real address range available for a memory with said central processing unit in the computer system, said memory coupled to said memory controller.

3. A computer implemented method for processing an invalid address request in a computer system as recited in claim 2 includes the step of storing said real address range in a register associated with said central processing unit of the computer system.

4. A computer implemented method for processing an invalid address request in a computer system as recited in claim 1 includes the step of issuing said address requested to said memory controller coupled to a memory in the computer system responsive to an identified valid address.

5. A computer implemented method for processing an invalid address request in a computer system as recited in claim 1 includes the step of posting an address exception to the user software responsive to said identified invalid address.

6. A computer implemented method for processing an invalid address request in a computer system as recited in claim 5 wherein the step of posting said address exception to the user software includes the step of posting a soft error to the user software.

7. A computer implemented method for processing an invalid address request in a computer system as recited in claim 1 further includes the step of continuing system operations in the computer system responsive to identifying an invalid address.

8. A computer implemented method for processing an invalid address request in a computer system as recited in claim 1 wherein said address requested from software is a virtual address request further includes the step of translating said virtual address request to said real address requested.

9. A computer program product for use in a computer system having a central processor unit, said computer program product comprises a computer usable medium having computer readable program code embodied on said medium for processing an invalid address request in the computer system using the central processor unit, the computer program product comprising:

means, recorded on the computer usable medium, for receiving an address requested from software;

means, recorded on the computer usable medium, for comparing a real address requested with a real address range available; the invalid address request being outside said real address range available; and means, recorded on the computer usable medium, responsive to identifying an invalid address, for issuing an interrupt to supervising software.

10. A computer program product for use in a computer system having a central processor unit, said computer program product comprises a computer usable medium having computer readable program code embodied on said medium for processing an invalid address request in the computer system as recited in claim 9 include means, recorded on the computer usable medium, for issuing said real address requested to a memory controller coupled to a memory in the computer system responsive to an identified valid address.

11. A computer program product for use in a computer system having a central processor unit, said computer program product comprises a computer usable medium having computer readable program code embodied on said medium for processing an invalid address request in the computer system using the central processor unit, as recited in claim 9 include means, recorded on the computer usable medium, for continuing system operations in the computer system responsive to said identified invalid address and an identified valid address.

12. A computer program product for use in a computer system having a central processor unit, said computer program product comprises a computer usable medium having computer readable program code embodied on said medium for processing an invalid address request in the computer system using the central processor unit, as recited in claim 9 include means, recorded on the computer usable medium, responsive to identifying said invalid address, for posting an address exception to the user software.

13. Apparatus for processing an invalid address request in a computer system including a central processor unit, a memory controller coupled between the central processor unit and a random access memory system storage, the central processor unit comprising:

means for receiving an address requested from software;

means for comparing a real address requested with a real address range available; the invalid address request being outside said real address range available; and means responsive to identifying an invalid address, for issuing an interrupt to supervising software.

14. Apparatus for processing an invalid address request in a computer system as recited in claim 13, wherein the central processor unit includes means for storing said real address range available for the random access memory storage.

15. Apparatus for processing an invalid address request in a computer system as recited in claim 13, wherein the central processor unit includes means for issuing said real address requested to the memory controller responsive to an identified valid address.

16. Apparatus for processing an invalid address request in a computer system as recited in claim 13, wherein the central processor unit includes means for continuing system operations in the computer system responsive to said identified invalid address and an identified valid address.

17. Apparatus for processing an invalid address request in a computer system as recited in claim 13, wherein the central processor unit include means for posting an address exception to a user software responsive to said identified invalid address.

18. Apparatus for processing an invalid address request in a computer system as recited in claim 13, wherein the central processor unit includes means for posting a soft error to the user software responsive to said identified invalid address.

19. Apparatus for processing an invalid address request in a computer system as recited in claim 13, wherein the central processor unit includes a register associated with the central processor unit for storing said real address range available for the random access memory storage.

* * * * *